US012120594B2

(12) United States Patent
Amar et al.

(10) Patent No.: US 12,120,594 B2
(45) Date of Patent: Oct. 15, 2024

(54) PROXIMITY DEVICE NETWORK

(71) Applicant: Visa International Service Association, San Francisco, CA (US)

(72) Inventors: Sumit Amar, Foster City, CA (US); Saloni Mahajan, Fremont, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 462 days.

(21) Appl. No.: 17/299,276

(22) PCT Filed: Dec. 6, 2018

(86) PCT No.: PCT/US2018/064276
§ 371 (c)(1),
(2) Date: Jun. 2, 2021

(87) PCT Pub. No.: WO2020/117247
PCT Pub. Date: Jun. 11, 2020

(65) Prior Publication Data
US 2022/0104102 A1    Mar. 31, 2022

(51) Int. Cl.
*H04W 40/32*       (2009.01)
*G06Q 20/20*       (2012.01)
(Continued)

(52) U.S. Cl.
CPC ............. *H04W 40/32* (2013.01); *H04W 4/06* (2013.01); *H04W 76/19* (2018.02); *G06Q 20/20* (2013.01); *H04W 84/18* (2013.01)

(58) Field of Classification Search
CPC ....... H04W 4/06; H04W 40/32; H04W 76/19; H04W 84/18; G06Q 20/20
See application file for complete search history.

(56) References Cited

U.S. PATENT DOCUMENTS 6,711,409 B1    3/2004    Zavgren, Jr. et al.
9,585,144 B1*   2/2017    Shaw .................... H04W 76/15
(Continued)

FOREIGN PATENT DOCUMENTS

| CN | 106068010 A | 11/2016 |
| CN | 108811079 A | 11/2018 |
| KR | 20170089911 A | 4/2017 |

OTHER PUBLICATIONS

Written Opinion received for SG Appl No. SG11202105846V mailed Oct. 31, 2022, 7 pages.
(Continued)

*Primary Examiner* — Syed Ali
*Assistant Examiner* — Kai Chang
(74) *Attorney, Agent, or Firm* — Kilpatrick Townsend & Stockton LLP

(57) ABSTRACT

A technique for establishing a device network using a wireless communication protocol is described. The technique may include determining peer devices within a communication range of a communication device, and determining whether any of the peer devices is part of a device cluster having less than a maximum number of device members. When a peer device within the communication range is determined to be part of an existing device cluster having less than the maximum number of device members, that existing device cluster can be updated to include the communication device. When each peer device within the communication range of the communication device is determined to be part of a full device cluster having the maximum number of device members, a new device cluster can be created to include the communication device and a plurality of peer devices meeting a signal strength criteria.

14 Claims, 9 Drawing Sheets

(51) Int. Cl.
*H04W 4/06* (2009.01)
*H04W 76/19* (2018.01)
*H04W 84/18* (2009.01)

(56) References Cited

U.S. PATENT DOCUMENTS

| | | | |
|---|---|---|---|
| 10,123,260 B2* | 11/2018 | Shmukler | H04W 76/23 |
| 10,217,130 B1* | 2/2019 | Varma | G06Q 30/0259 |
| 10,285,040 B2* | 5/2019 | Liu | H04W 4/80 |
| 11,042,863 B1* | 6/2021 | Omojola | G06Q 20/40 |
| 2013/0117226 A1 | 5/2013 | Jain et al. | |
| 2013/0191881 A1 | 7/2013 | Linden et al. | |
| 2015/0006633 A1 | 1/2015 | Vandwalle et al. | |
| 2015/0023213 A1* | 1/2015 | Soneda | H04L 45/20 370/254 |
| 2015/0023214 A1 | 1/2015 | Soneda et al. | |
| 2015/0098388 A1* | 4/2015 | Fang | H04W 48/18 370/328 |
| 2015/0200811 A1* | 7/2015 | Kasslin | H04W 8/186 370/254 |
| 2015/0334181 A1 | 11/2015 | Jimenez et al. | |
| 2016/0323925 A1* | 11/2016 | Alanen | H04W 8/005 |
| 2016/0353233 A1 | 12/2016 | Yong et al. | |
| 2017/0201858 A1* | 7/2017 | Li | G06Q 50/01 |
| 2017/0273005 A1 | 9/2017 | Daragon et al. | |
| 2017/0331696 A1 | 11/2017 | Gupta et al. | |
| 2018/0060855 A1* | 3/2018 | Keshan | G06Q 20/3223 |
| 2019/0320407 A1* | 10/2019 | Goyal | H04L 41/5058 |
| 2019/0347679 A1* | 11/2019 | Banerjee | G06F 16/29 |
| 2021/0185605 A1* | 6/2021 | Liu | H04W 48/16 |
| 2021/0216991 A1* | 7/2021 | Grassadonia | G06Q 20/385 |

OTHER PUBLICATIONS

International Search Report and Written Opinion received for International Appl. No. PCT/US2018/064276 mailed Aug. 29, 2019, 11 pages.
Extended European Search Report received for EP Application No. 18942110.0 mailed on Nov. 25, 2021, 8 pages.
Office Action, mailed Oct. 28, 2023, Chinese Patent Application No. CN201880099916.3, 18 pages.
Office Action, mailed Feb. 16, 2024, European Patent Application No. EP18942110.0, 7 pages.
Notice of Decision to Grant, mailed Apr. 11, 2024, Singapore Patent Application No. SG11202105846V, 4 pages.

* cited by examiner

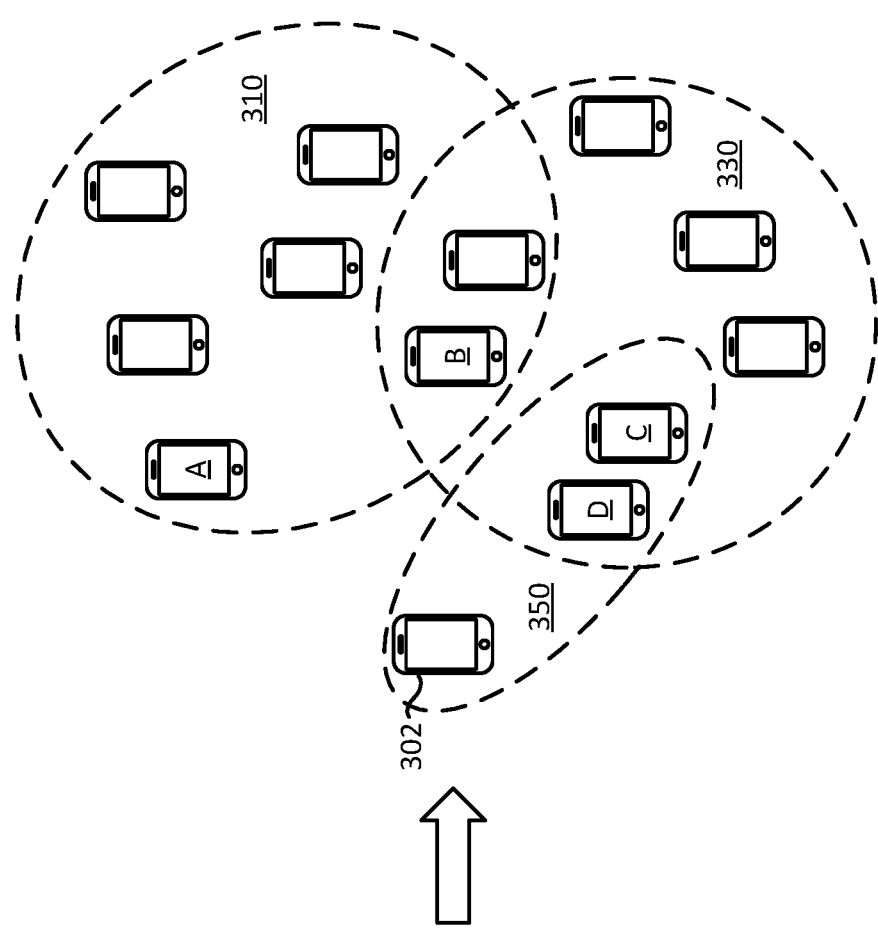
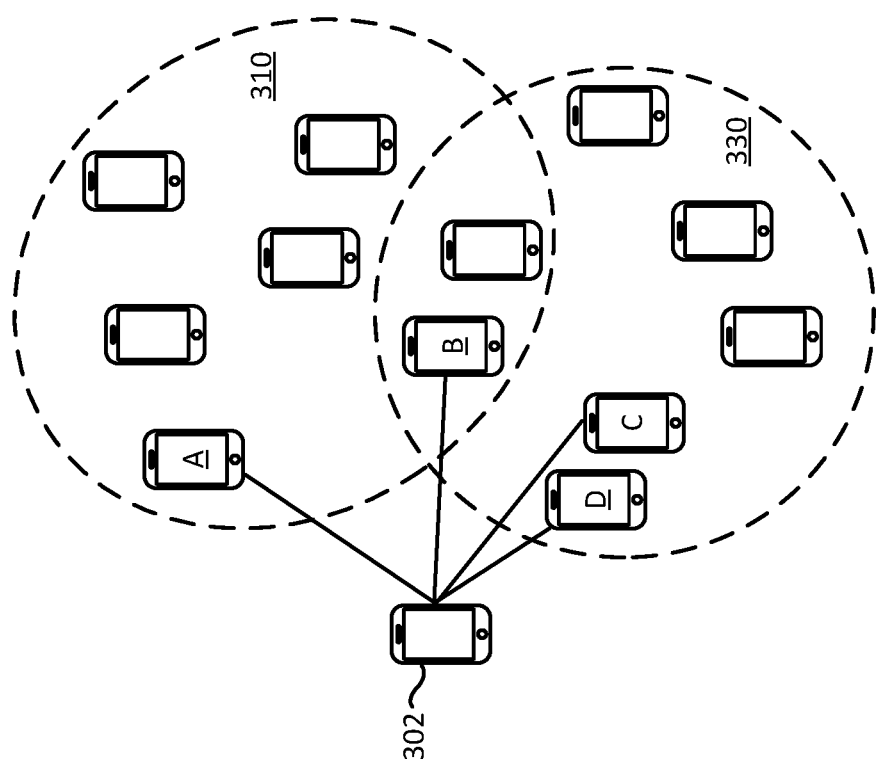

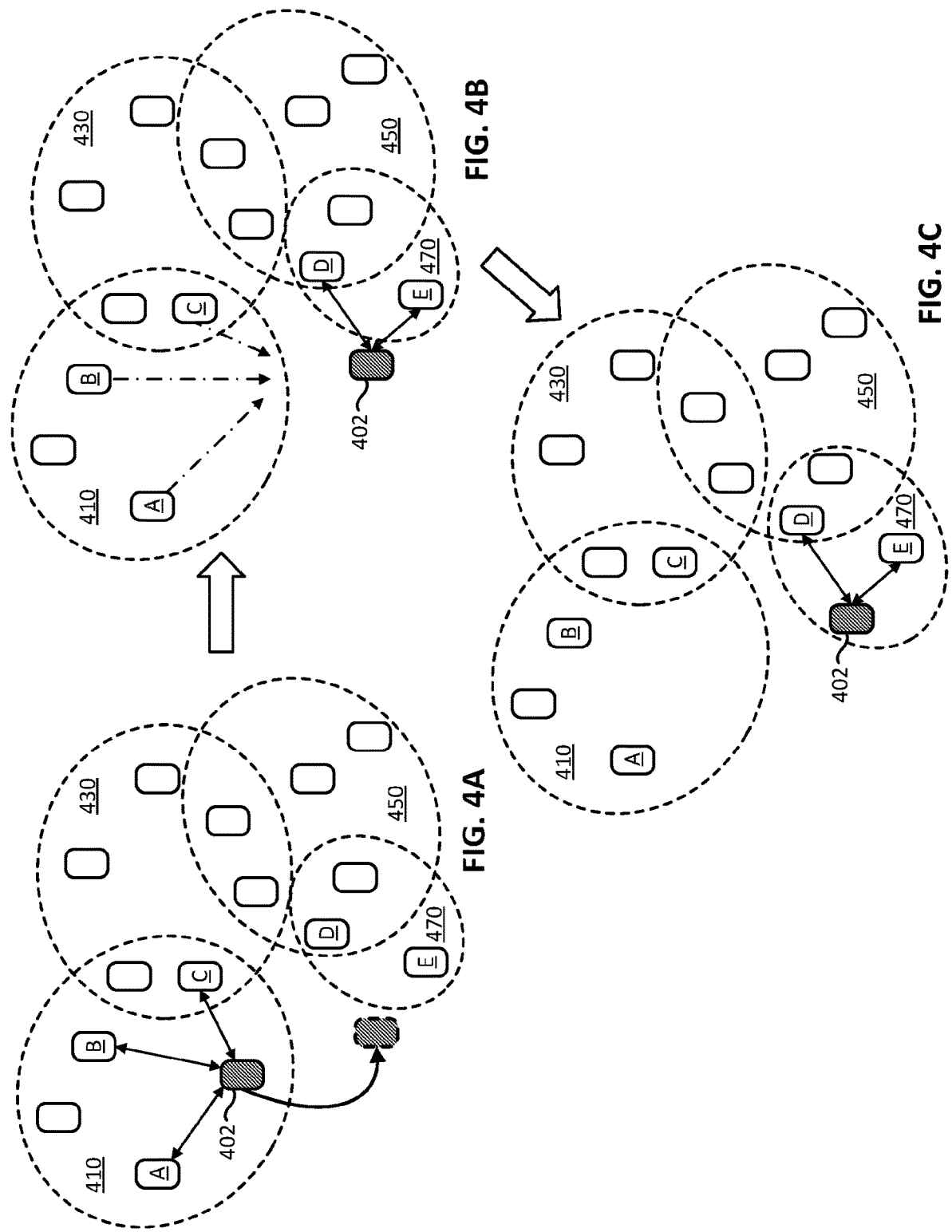

PROXIMITY DEVICE NETWORK

CROSS-REFERENCES TO RELATED APPLICATIONS

This application is a National Stage of International Application No. PCT/US2018/064276, filed Dec. 6, 2018, the entirety of which is incorporated herein by reference for all purposes.

BACKGROUND

Point-to-point wireless communication technologies can allow devices in proximity to each other to connect and exchange data without requiring an intermediary network device such as a gateway or central server. However, the communication range and the number of interconnected devices can be limited when using such wireless communication technologies. As such, these wireless communication technologies have not been widely adopted for use in environments or applications in which an extended coverage area is desired or in which many devices can be present at the same time.

Embodiments of the present invention address these and other problems individually and collectively.

BRIEF SUMMARY

According to some embodiments, a technique for establishing a device network may include determining a set of peer devices within a communication range of a communication device using a wireless communication protocol, and determining whether any of the peer devices is part of a device cluster having less than a maximum number of device members. The wireless communication protocol may allow a device to maintain concurrent connections with up to a maximum number of concurrently connected devices. When a peer device in the set of peer devices within the communication range of the communication device is determined to be part of an existing device cluster having less than the maximum number of device members, that existing device cluster can be updated to include the communication device. When each peer device in the set of peer devices within the communication range of the communication device is determined to be part of a full device cluster having the maximum number of device members, a new device cluster can be created to include the communication device and a plurality of peer devices in the set of peer devices meeting a signal strength criteria.

According to some embodiments, a communication device may include a transceiver adapted to exchange data using a wireless communication protocol, a processor, and a memory storing executable code, which when executed by the processor, causes the communication device to perform the above technique for establishing a device network.

BRIEF DESCRIPTION OF THE DRAWINGS

FIG. 3A illustrates the another state of a device network when a new device comes into vicinity of the device network, according to some embodiments.

FIG. 3B illustrates the another state of a device network after adding a new device to the device network, according to some embodiments.

FIG. 4A illustrates the initial state of a device network, according to some embodiments.

FIG. 4B illustrates the state of a device network after a device moved from one location to another, according to some embodiments.

FIG. 4C illustrates the state of a device network after a device switches device cluster, according to some embodiments.

DETAILED DESCRIPTION

Figure 1:
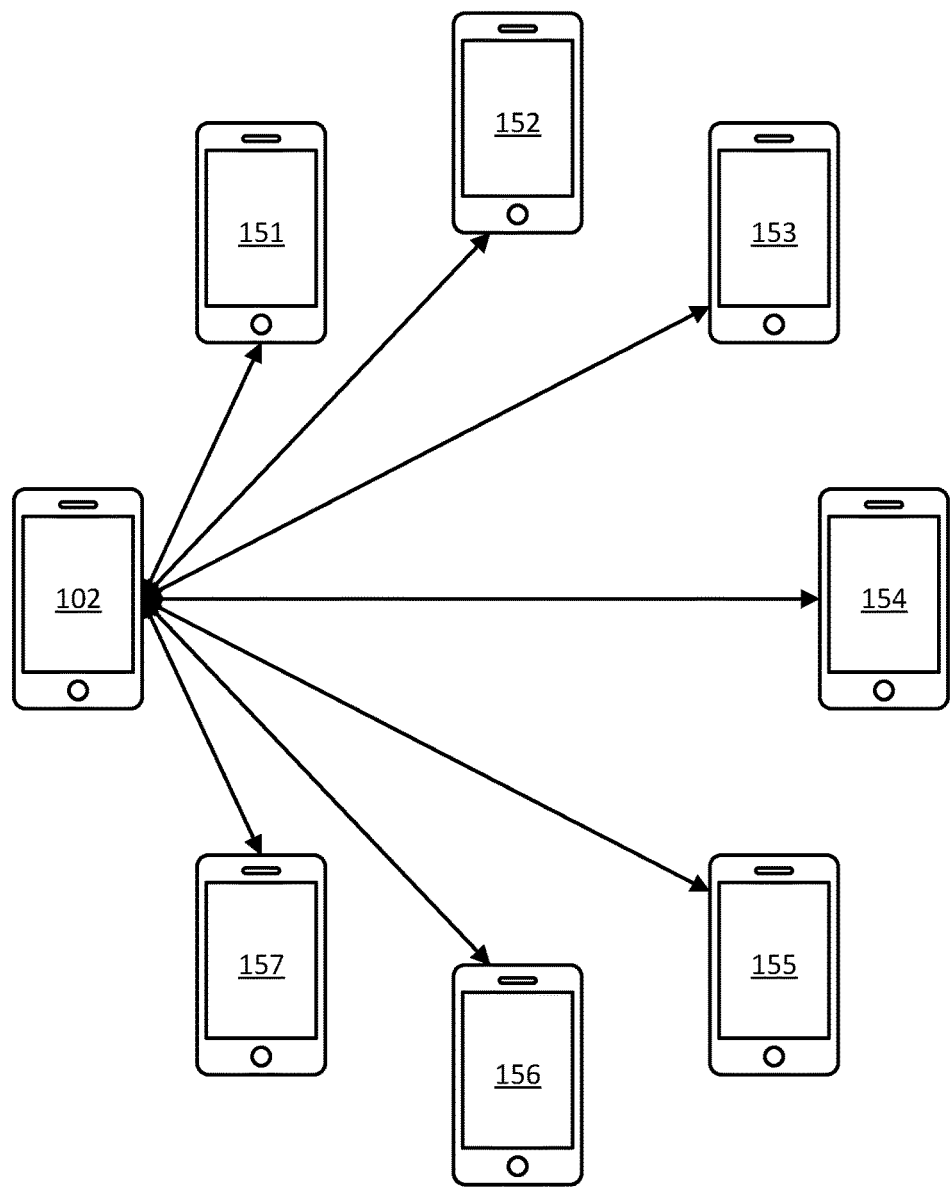
FIG. 1 illustrates a device network, according to some embodiments.

Techniques for establishing a network made up of devices wirelessly communicating with each other are described. The techniques can be used to enhance the capabilities of a wireless communication protocol including those that employs point-to-point wireless communication technologies such as Bluetooth, Bluetooth Low Energy, WiFi-Direct, etc. For example, the techniques described herein can be used to extend the communication range of the wireless communication protocol and/or increase the number of interconnected devices allowable by the wireless communication protocol. Each of the devices in the network can maintain a local copy of network state information describing the configuration of the network such that each device is aware of other devices in the network, and changes to the network configuration can be propagated from one device to another within the network.

Prior to discussing the details of the various embodiments, an explanation of various terms are provided below.

A "wireless communication protocol" may refer to a specified technique for allowing two or more devices to exchange data with each other without requiring a physical wired connection between the devices. A wireless communication protocol can be a standardized communication protocol or be a proprietary communication protocol. Examples of wireless communication protocols may include Bluetooth, Bluetooth Low Energy (BLE), WiFi, WiFi-Direct, Zigbee, Z-Wave, NFC, RFID, etc.

A "communication device" may refer to a device that includes one or more electronic components (e.g., an integrated chip) that can communicate with another device or entity. For example, a communication device can be a computing device that includes at least one processor coupled to a memory that stores instructions or code for execution by the processor, and may include a communication interface such as a transceiver that allows the communication device to interact with other entities. A communication device can be a portable communication device that can be transported and operated by a user. A portable communication device may provide remote communication capabilities to a network. The portable communication device can be configured to transmit and receive data or communications to and from other devices. A portable communication device may be in the form of a mobile device such as a mobile phone (e.g., smart phone, cellular phone, etc.), tablets, portable media player, personal digital assistant devices (PDAs), wearable device (e.g., watch, bracelet, ring, eyeglasses, health monitoring device such as a fitness tracker, etc.), electronic reader device, etc., or in the form of a card (e.g., smart card) or a fob, etc. Examples of portable communication devices may also include portable computing devices (e.g., laptops, netbooks, ultrabooks, etc.). A portable communication device may also be in the form of a vehicle (e.g., an automobile), or be integrated as part of a vehicle (e.g., an infosystem of a vehicle). Other examples of communication devices may include Internet of Things (IoT) devices, smart appliances and electronics, gaming consoles, etc. A communication device may also include multiple devices or components (e.g., when a device has remote access to a network by tethering to another device—both devices taken together may be considered a communication device). Communication devices that may be communicatively coupled with each other within a device network may be referred to as "peer devices."

A "device identifier" may refer to a unique device identifier associate with a device. For example, a device identifier can be one or more of an electronic serial number of the device, a serial number of a component of the device (e.g., a subscriber identity module (SIM) serial number), a media access control (MAC) address of the device, an International Mobile Station Equipment Identity (IMEI) number associated with the device, an International Mobile Subscriber Identity (IMSI) number associated with the device, a network services framework identifier associated with the device, an Internet Protocol (IP) address of the device, or other unique identifier (e.g., random number, pseudo random number, counter value, etc.) assigned to a device. In some embodiments, one or more of the device identifiers may be immutable and do not change during the lifetime of the device or while the device is connected to a particular network. In some embodiments, one or more of the device identifiers may be immutable as long as the device remains associated with the same user.

A "server computer" may refer to a powerful computer or cluster of computers. For example, the server computer can be a large mainframe, a minicomputer cluster, or a group of servers functioning as a unit. The server computer can be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

An "access device" may refer to a suitable device for communicating with a resource provider. An access device may generally be located in any suitable location, such as at the location of the service provider or a merchant, or can be at a remote location (e.g., in the cloud). Examples of an access devices may include a point-of-sale (POS) device, a personal computers (PCs), tablet PCs, hand-held specialized readers, set-top boxes, electronic cash registers (ECRs), automated teller machines (ATMs), virtual cash registers (VCRs), kiosks, security systems, access systems, etc. An access device can also be a web server, a merchant computer, or a transaction processing network that can interact with a user's communication device. A user's communication device such as a user's mobile device can also act as an access device. An access device may use any suitable contact or contactless mode of operation to send or receive data with a communication device. An access device may include a processor, a computer-readable medium, and a device reader. A device reader may include contact and/or contactless mode of operations. For example, a card reader can include one or more radio frequency (RF) antenna, optical scanners bar code reader, or magnetic stripe reader to interact with a communication device.

A "user" may refer to an entity such as a person, an organization, or a device or system associated with or operated by the person or organization that utilizes a resource for some purpose. A user may have one or more accounts that can be used to access the resource. A user may also be referred to as an account holder, a consumer, a subscriber, or a cardholder, etc.

A "resource" may refer to a service, an item, a location, data, information, or something of value that assists a user with achieving some purpose. Some resources may be restricted, and may require a user to have an account to access the resource. Examples of resources may include software applications and related functions; online services including cloud services; goods (virtual and/or physical objects) or services related to transactions; credits, points, and/or currencies that can be exchanged for other resources; electronic devices such as servers, computers, mobile devices, gaming systems, etc.; transportation such as vehicles or transit services, communications capabilities such as wireless services; restricted areas; media content; etc.

FIG. 1 illustrates a device network 100, according to some embodiments. Device network 100 may include a communication device 102 operated by a user and a set of peer devices 151-157 (e.g., other communication devices) operated by one or more other users and/or entities. Although peer devices 151-157 are shown to be similar to communication device 102, it should be understood that any of peer devices 151-57 can be a different type of communication device or may provide one or more functionalities and/or capabilities that are different than communication device 102. Each of communication device 102 and peer devices 151-157 may include a transceiver adapted to exchange data using a wireless communication protocol. The transceiver may include one or more antenna structures and/or one or more integrated circuits to enable the device to transmit and receive data in accordance with the wireless communication protocol.

In some embodiments, the wireless communication protocol may have an upper limit as to how many concurrent connections a device can maintain. In other words, the wireless communication protocol may allow a device to maintain connections with up to only a maximum number of concurrently connected devices. For example, the Bluetooth family of protocols (e.g., Bluetooth, BLE, etc.) may allow a device to maintain up to seven concurrent connections. Accordingly, in embodiments in which device network 100 is employing a wireless communication protocol form the Bluetooth family of protocols, communication device 102 may only be able to connect with up to seven other devices at the same time as shown. Thus, if communication device 102 wants to exchange data with another device, communication device 102 would have to disconnect from one of the peer devices 151-157 and establish a new connection to that other device using the wireless communication protocol. Accordingly, device network 100 may not be suitable for use in environments or applications that may have more than eight devices present at the same time.

Another constraint of device network 100 is that the technology of the wireless communication protocol employed by the network may have a limited communication range. For example, Bluetooth can have a limited range of less than 100 meters. Thus, if any of the peer devices 151-157 travel beyond the communication range of communication device 102, communication device 102 may lose connectivity with that peer device and may not be able to continue exchanging data with that peer device. As such, device network 100 may not be suitable for use in environments or applications where the coverage area is beyond the communication range of the wireless communication protocol employed by the network.

According to some embodiments, to extend the number of interconnected devices and communication range, devices can form a device network of overlapping device clusters. Each device cluster may include one or more devices that belong to multiple device clusters. Each device cluster in the network may have up to a predetermined maximum number of device members. The predetermined maximum number of device members in a device cluster can be set to be equal to the maximum number of concurrently connected devices allowable for a device using the wireless communication protocol. Thus, each device may maintain connections with up to one less than the maximum number of concurrently connected devices allowable by the wireless communication protocol such that each device can have an open communication channel that is not dedicated to any particular connection with another device. A device also need not maintain connections with every other device in the device cluster that the device belongs to, so long as the device maintains a connection with at least one other device in the device cluster.

By way of illustration using the Bluetooth family of protocols as an example, the maximum number of concurrently connected devices allowable for a device by the wireless communication protocol is seven devices (e.g., a device may maintain up to seven connections with other devices). Accordingly, the predetermined maximum number of device members in a device cluster can be set to seven devices (equal to the maximum number of concurrently connected devices allowable by the wireless communication protocol), and a device can maintain up to six connections with other devices. It follows then that the maximum number of device clusters that any one device can belong to is six device clusters, in which case the device would maintain a connection with one device from each of the six different device clusters.

Establishing a device network as such allows each device in the device cluster to reserve one open communication channel to communicate with a new device that comes within range to facilitate adding that new device to the device network. Each device in the device network may also store a local copy of the network state information, which can include information about the number of device clusters in the network, and the device members of each device cluster in the network. The network state information may also include application specific information intended to be shared amongst the devices in the network. When the network state changes as devices are added or removed from the network, devices in the network moves from one location to another causing the makeup of the device clusters to change, or as the interactions between the devices change state, etc., updated network state information can be broadcasted and propagated to devices throughout the network such that each device can update its local copy of the network state information.

In some embodiments, the network state information being transmitted can include a timestamp such that a recipient device can determine if the received network state information is newer than the local copy of the network state information by comparing their timestamps. If the received network state information is newer and different than the local copy, the recipient device can update the locally stored network state information with the received network state information. If the local copy is newer or contains the same information as the received network state information, then no update to the local copy of the network state information is necessary.

Figure 2B:
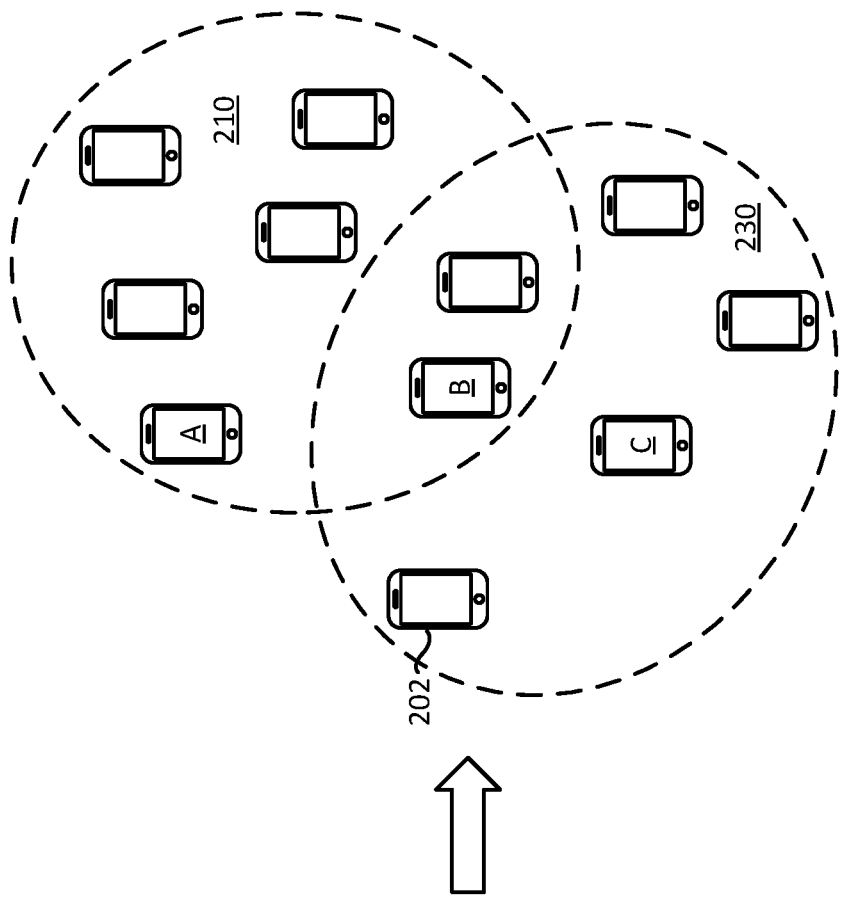
FIG. 2B illustrates the state of a device network after adding a new device to the device network, according to some embodiments.
Figure 2A:
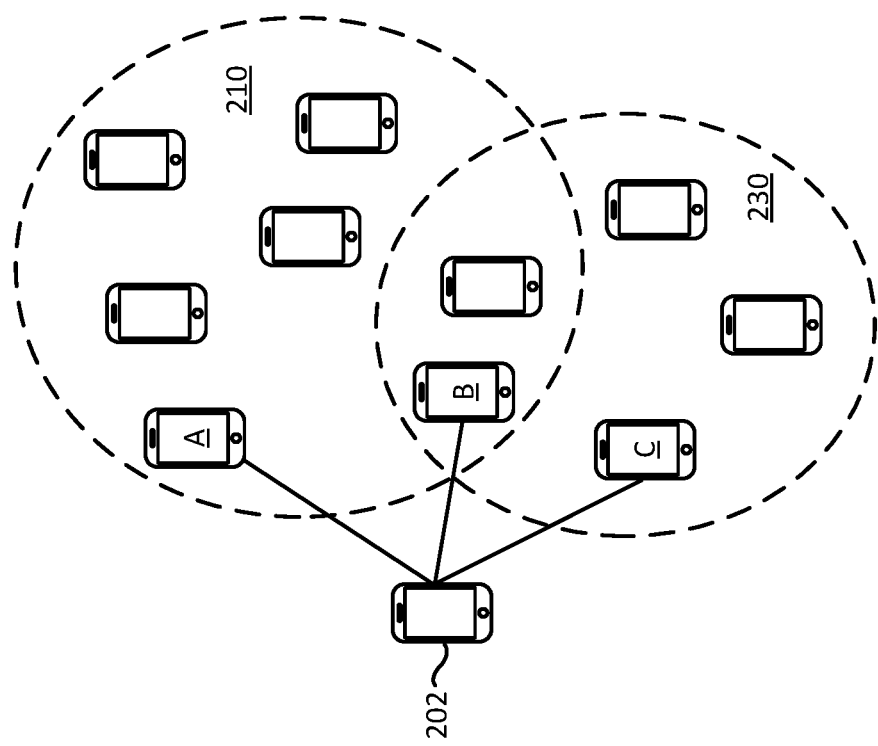
FIG. 2A illustrates the state of a device network when a new device comes into vicinity of the device network, according to some embodiments.

FIGS. 2A and 2B illustrate a process of adding a new device to a device network, according to some embodiments. The wireless communication protocol employed by the device network shown in FIGS. 2A and 2B may allow a device to maintain up to a maximum of seven concurrently connected devices (e.g., if using a protocol from the Bluetooth family of protocols), and thus the maximum number of device members in a device cluster can be set to seven devices. The device network in FIG. 2A includes two device clusters 210 and 230. Device cluster 210 includes seven peer devices including peer devices A and B, and thus device cluster 210 already has the maximum number of device members. Device cluster 230 includes five peer devices including peer devices B and C, and has not yet reached the maximum number of device members.

When a communication device 202 comes within the vicinity of the device network, communication device 202 may detect the presence of peer devices A, B, and C that are within communication range of communication device 202 (e.g., by detecting a beacon transmitted from peer devices A, B, and C). During this discovery phase, peer devices A, B, and C may provide communication device 202 with network configuration information such as a count of the number of devices of the device clusters that peer devices A, B, and C are part of. For example, peer device A may indicated to communication device 202 that peer device A is part of device cluster 210 with seven devices; peer device B may indicated to communication device 202 that peer device B is part of device cluster 210 with seven devices and device cluster 230 with five devices; and peer device C may indicated to communication device 202 that peer device C is part of device cluster 230 with five devices.

Upon receiving the network configuration information, communication device 202 can determine that device cluster 210 already has the maximum number of device members, while device cluster 230 has less than the maximum number of device members. As such, in order for communication device 202 to join the device network, communication device 202 can be added to device cluster 230 but not to device cluster 210, because device cluster 210 is already full. Communication device 202 may then join device cluster 230 by establishing a connection with peer device B and/or peer device C. Once in the connected mode, peer device B and/or peer device C can provide communication device 202 with network state information including the cluster identifier of each device cluster in the network, and the device identifier of each device member in each cluster. The network state information may also include other application specific information. Communication device 202 can the update the network state information to add the device identifier of communication device 202 to the list of devices associated with the cluster identifier of device cluster 230, and transmit the updated network state information to other devices in the network. For example, communication device 202 may provide the updated network state information to peer devices B and C that are within communication range of communication device 202. Peer device B and C can then update their own local copy of the network state information, and provide the updated network state information to other devices to propagate the updated network state information to all devices within the device network. The resulting network configuration after communication device 202 has joined device cluster 230 is shown in FIG. 2B.

In some embodiments, as an added layer of security, a new device may not be allowed to update the network state information, and either peer device B or peer device C (as an existing member of the device network) can initiate the update to the network state information to add communication device 202 to device cluster 230. For example, peer device B (or peer device C) may update its local copy of the network state information to add the device identifier of communication device 202 to the list of devices associated with the cluster identifier of device cluster 230, and transmit the updated network state information to communication device 202 and other devices within range.

Although the wireless communication protocol employed by the device network may have a limited range and/or may limit the number of devices that a device can concurrently connect with, by establish the network according to the above technique, communication device 202 can exchange data with any number of devices in device clusters 210 and 230 even if the device is out of the immediate range of communication device 202. For example, communication device 202 may transmit data to peer device B that is within range of communication device 202, and peer device B may propagate the data to other peer devices in device clusters 210 and/or 230 that may be beyond the range of communication device 202. The data can also be provided to more peer devices than what is allowable by direct connection under the wireless communication protocol.

The technique described above can be suitable for use with wireless communication protocols such as the Bluetooth family of protocols that have a discovery phase and a connected phase. A device that is part of the device network can broadcast a small amount of network configuration information such as the count of device members in a parent device cluster to facilitate the addition of new devices in the discovery phase coming within range of the device network, while more detailed network state information such as the cluster identifiers, device identifies, and application specific data can be transmitted in the connected phase with devices that have been added to the network. Such technique can also prevent a listening device from obtaining more sensitive information that may be included network state information, because the network state information is only shared amongst devices that have been added to the network and not to devices in the discovery phase. In some embodiments, the network state information (e.g., cluster identifiers, device identifies, and/or application specific data, etc.) can alternatively or additionally be provided to new devices in the discovery phase.

FIGS. 3A and 3B illustrate another process of adding a new device to a device network, according to some embodiments. The device network in FIG. 3A includes two device clusters 310 and 330. Device cluster 310 includes seven peer devices including peer devices A and B, and thus device cluster 310 already has the maximum number of device members. Device cluster 330 also includes seven peer devices including peer devices B, C, and D, and thus device cluster 330 also has the maximum number of device members.

When a communication device 302 comes within the vicinity of the device network, communication device 302 may detect the presence of peer devices A, B, C, and D that are within communication range of communication device 302. Each of peer devices A, B, C, and D can provide communication device 302 with the current network configuration information of the device network. Upon receiving the current network configuration information, communication device 302 may determine that device clusters 310 and 330 already have the maximum number of device members. As such, communication device 302 may not be able to join the device network by adding communication device 302 to an existing device cluster, because all device clusters within the range of communication device 302 already have the maximum number of device members.

Nevertheless, communication device 302 can still join the device network by creating a new device cluster. In the situation where all peer devices within range of communication device 302 belong to full device clusters, a new device cluster can be created, and communication device 302 and at least one other peer device within range of communication device 302 can be added to the newly created device cluster. For example, communication device 302 and peer devices that meet a certain signal strength criteria can be added to the newly created device cluster. In some embodiments, the signal strength criteria can be a predetermined number of peer devices (e.g., two peer devices) with the highest signal strengths as detected by communication device 302, or peer devices having a signal strength above a certain threshold.

Referring to FIG. 3B, communication device 302 may join the device network by creating a new device cluster 350 by adding a new cluster identifier to the list of cluster identifiers to a local copy of the network state information. The new cluster identifier can be randomly or pseudo-randomly generated, be selected from a list of available cluster identifiers, be a sequential value such as a counter value counting the number of device clusters in the network, or be a unique identifier assigned from the network. Communication device 302 may add itself and peer devices C and D (e.g., the two peer devices with the highest signal strengths) to the new device cluster 350, by associating the corresponding device identifiers to the cluster identifier of the newly created device cluster 350 in the local copy of the network state information. The updated network state information including information about the newly created device cluster 350 can then be propagated to the other peer devices in the network. The resulting device network may then have three device clusters: device cluster 310 having seven peer devices including peer devices A and B, device cluster 330 having seven peer devices including peer devices C and D, and device cluster 350 having communication device 302 and peer devices C and D as shown in FIG. 3B.

In some embodiments, a newly created device cluster may attempt to add an existing peer device that has reached its limit of concurrent connections. For example, referring to FIG. 3B, at the time device cluster 350 is being created, peer device D may already be maintaining six concurrent connections with the other peer devices in device cluster 330. As such, in order to add peer device D to the newly created device cluster 350 and maintain a connection with communication device 302 in device cluster 350, peer device D may be requested to disconnect an existing connection such that peer device D does not exceed the maximum number of concurrent connections. Peer device D may select which device to disconnect from, and then update and propagate the network state information accordingly. In some embodiments, in order to maintain the existing device cluster memberships, a peer device being added a new device cluster may disconnect from only those devices that are part of a device cluster having multiple devices connected to the peer device. For example, if peer device B is the only peer device from device cluster 310 that is connected to peer device D, then peer device B may not select peer device D as the device to disconnect from, because doing so may cause peer device B to be removed from device cluster 310.

According to some embodiments, subsequent to a new communication device joining the device network (e.g., after being added to an existing device cluster or to a newly created device cluster), the communication device may at some point lose connectivity with other peer devices in the device cluster that the communication device is part of. For example, the communication device may move to a location out of the communication range of the other peer devices. FIGS. 4A-C illustrate such a scenario and a process for reestablishing connectivity with a device network, according to some embodiments.

The initial network configuration of the device network shown in FIG. 4A may include four device clusters: device cluster 410 including communication device 402 and peer devices A, B, and C; device cluster 430 including peer device C; device cluster 450 including peer device D, and device cluster 470 including peer devices D and E. When communication device 402 joined the device network as a member of device cluster 410, communication device 402 may have established and maintained a connection with peer devices A, B, and C. As communication device 402 moves to a different location shown in the dotted line closer to device cluster 470, communication device 402 may lose connectivity with peer devices A, B, and C as shown in FIG. 4B. In response to communication device 402 losing connectivity with peer devices A, B, and C in device cluster 410 that communication device 402 was part of, communication device 402 may attempt to re-establish connection with peer devices A, B, and C for a predetermined number of times (e.g., five times, ten times, etc.), or over a predetermined time-out period (e.g., five seconds, ten seconds, etc.).

If communication device 402 fails to re-establish connection with peer devices A, B, and C in device cluster 410 after the predetermined number of attempts or after the predetermined time-out period has elapsed, communication device 402 may attempt to establish connectivity with other peer devices that are not part of device cluster 410 that communication device 402 was originally part of. Communication device 402 may then obtain the current network configuration and/or network state information from these other peer devices, and can either join another device cluster or create a new device cluster. For example, referring to FIG. 4B, communication device 402 may establish connectivity with peer devices D and E of device cluster 470 after losing connectivity with peer devices A, B, and C, and obtain the current network configuration information from peer devices D and E. Communication device 402 can determine that device cluster 470 has only three device members, and thus communication device 402 can join device cluster 470 to re-establish connectivity with the device network. Communication device 402 can connect with peer devices D and E, then update the network state information to add itself to device cluster 470, and provide and propagate the updated network state information to other peer devices in the network. The resulting network configuration after communication device 402 moves to the new location is shown in FIG. 4C, which may include four device clusters: device cluster 410 including peer devices A, B, and C; device cluster 430 including peer device C; device cluster 450 including peer device D, and device cluster 470 including communication device 402 and peer devices D and E. Alternatively, if device cluster 470 is already full, communication device 402 may create a new cluster and add itself and peer devices D and E to the newly created cluster.

Figure 5:
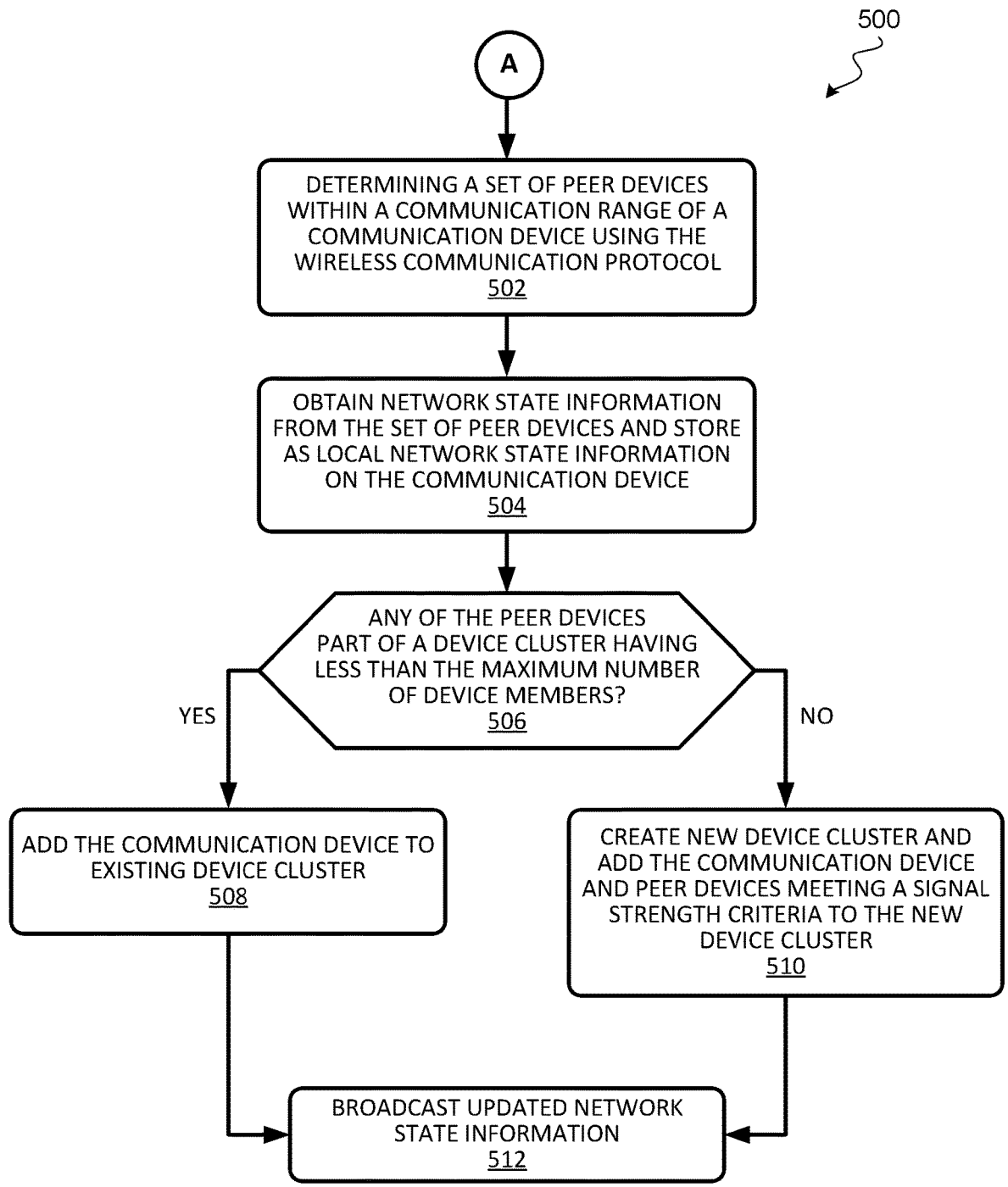
FIG. 5 illustrates a flow diagram of a process for establishing a device network, according to some embodiments.

FIG. 5 illustrates a flow diagram of a process 500 for establishing a device network, according to some embodiments. At block 502, a communication device operated by a user may enter the vicinity of a device network. The communication device may determine a set of peer devices (e.g., other communication devices) within a communication range of the communication device using a wireless communication protocol. For example, communication device may detect a discovery signal (e.g., a beacon) in accordance with the wireless communication protocol from the peer devices within range indicating the presence of the peer devices. The peer devices may belong to one or more device clusters within the device network. In some embodiments, the discovery signal transmitted from a peer device may include a count of the number device members in the device cluster(s) that the peer device is part of.

At block 504, the communication device may establish connections with some or all of the peer devices within communication range using the wireless communication protocol. For example, the communication device may establish connections with a predetermined number of peer devices (e.g., two peer devices) with the highest signal strengths detectable by the communication device. The communication device may then obtain network state information from the peer devices, and store a local copy of the network state information on the communication device. The network state information may include information about the makeup of the device network including a list of device clusters and the devices belonging to each device cluster. For example, the network state information may include a list of device cluster identifiers corresponding to the device clusters, and a list of device identifiers of devices associated with each device cluster identifier. It should be noted that a device can belong to more than one device cluster, and thus a device identifier can be associated with multiple device cluster identifiers in the network state information. In some embodiments, the network state information may also include a timestamp to indicate how current the network state information is. If the communication device receives different network state information from different peer devices, the communication device may store the received network state information having the most recent timestamp as the local copy. The network state information may also include other data intended for propagation to the devices throughout the network. For example, the network state information may include additional application specific data such as information pertaining to how the devices in the network are interacting with each other (e.g., which devices are paired together to performed certain functions, etc.).

At block 506, a determination is made as to whether any of the peer devices within communication range of the communication device is part of a device cluster having less than the maximum number of device members allowable for a device cluster. In some embodiments, the maximum number of device members allowable for a device cluster can be set to be equal to the maximum number of concurrently connected devices allowed by the wireless communication protocol. For example, if the wireless communication protocol being used is part of the Bluetooth family of protocols, the maximum number of concurrently connected devices allowable by the protocol that any particular device can connect with is seven other devices. Thus, under this example, the maximum number of device members for a device cluster can be set to seven devices, and the communication device can determine whether any of the peer devices within communication range of the communication device is part of a device cluster having less than seven devices based on the network state information provided from the peer devices.

At block 508, when a peer device in the set of peer devices within communication range of the communication device is determined to be part of an existing device cluster having less than the maximum number of device members, the communication device can be added to that existing device cluster. For example, the communication device can join an existing device cluster by updating its local network state information to associate the device identifier of the communication device to the device cluster identifier of that existing device cluster. In some embodiments, if there are multiple device clusters that the communication device can join, the communication device may select the device cluster with the peer device having the strongest signal strength as the device cluster to join.

At block 510, when each peer device in the set of peer devices within the communication range of the communication device is determined to be part of a full device cluster having the maximum number of device members, a new device cluster can be created because there are no available existing device cluster for the communication device to join. The communication device and one or more peer devices in the set of peer devices meeting a signal strength criteria can be added to the new device cluster. In some embodiments, the signal strength criteria can be the two peer devices with the highest signal strengths detected by the communication device, or some other predetermined number of peer devices with the highest signal strengths. In some embodiments, the signal strength criteria can be the peer devices with signal strengths above a certain signal strength threshold. The new device cluster can be created, for example, by the communication device updating its local network state information to include a new device cluster identifier, and associating with the new device cluster identifier the device identifiers of the communication device and the peer devices to add.

At block 512, the local network state information is further updated with the current timestamp, and the updated network state information (which may include either a newly created device cluster that the communication device is part of, or the addition of the communication device to an existing device cluster) can be broadcasted to the peer devices within range of the communication device. The peer devices receiving the updated network state information can further propagate the information to other devices in the device network until all devices in the device network has the updated network state information.

In some embodiments, each device in the device network may send out its network state information at a periodic interval (e.g., as part of a beacon), or in response to a change to its local copy of the network state information. When a device (e.g., the communication device of a user, or a peer device, etc.) receives network state information from another device, the device can compare the timestamp of the received network state information with its own local copy of the network state information to determine if which one is newer. If the received network state information is newer, and the network configuration (e.g., device cluster identifiers and their associated device identifiers) indicated by the received network state information is different than the local copy of the network state information, then the device can update the locally stored network state information with the received network state information.

Figure 6:
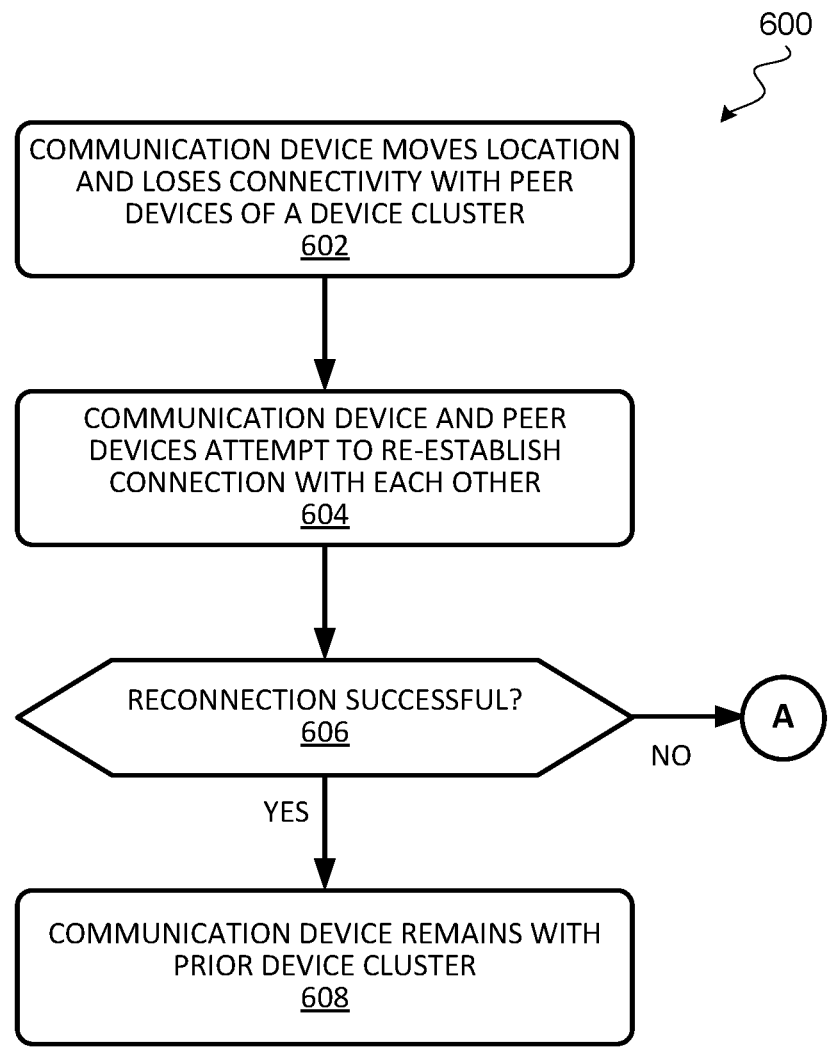
FIG. 6 illustrates a flow diagram of a process 600 for reconnecting with a device network, according to some embodiments.

FIG. 6 illustrates a flow diagram of a process 600 for reconnecting with a device network subsequent to adding a communication device to either an existing device cluster or a newly created device cluster, according to some embodiments. At block 602, a communication device that is already part of a device cluster and part of the device network may move from one location to another, causing the communication device to lose connectivity with the peer devices in the device cluster that the communication device was part of. For example, the communication device may no longer detect or receive a periodic beacon from the peer devices that were previously connected with the communication device.

At block 604, in response to the communication device losing connectivity with the peer devices in the device cluster that the communication device was part of, the communication device and/or the peer devices may attempt to re-establish connection with each other. For example, the communication device may attempt to re-establish connection with the other peer devices a predetermined number of times, or for a predetermined time-out period, and the peer devices that were previously communicatively connected to the communication device may attempt to do the same.

At block 606, a determination is made as to whether the communication device successfully reconnected with any of the peer devices from the device cluster that the communication device was part of. If the communication device reconnects with at least one of the peer devices from the device cluster that the communication device was part of, then the communication device can remain with the prior device cluster. Because the device cluster association has not changed, it may be unnecessary to update the network state information. If the communication device fails to re-establish connection with the other peer devices in the device cluster after the predetermined number of attempts or predetermined time-out period, the communication device may perform process 500 to establish connectivity with other devices that are not part of the original device cluster, and either joins another device cluster or creates another new device cluster.

As discussed above, the device networking technique described herein can be used in environments or applications where the coverage area may span beyond the immediate communication range of the wireless communication protocol employed by the network, and/or where many devices may be present at the same time. One example of such an environment can be a merchant location where transactions are conducted between communication devices of consumers visiting the merchant location and access devices (e.g., point-of-sale terminal) at the merchant location using a wireless communication technology such as Bluetooth LE (BLE) or other wireless communication protocol.

In a merchant location where there are multiple access devices that a user's communication device can connect with to execute a transaction, one consideration to take into account is how to connect a user's communication device to an appropriate terminal. For example, in a fuel station scenario, the vehicle's infosystem acting as the user's communication device should inform the driver about an available gas pump (e.g., a gas pump number) so that the user can drive the vehicle to the appropriate pump. Similarly in other scenarios, a user should be informed about the correct kiosk to checkout for goods, the correct parking meter, or toll booth lane, etc. By using the device network techniques described herein, a device network that includes BLE enabled communication devices and access terminals can exchange network state information to inform the devices in the network as to which access terminal is available and which access terminal is in use. This allows the devices to stay disconnected from the Internet, because the relevant network state information is provided from peer devices. This also allow devices in the device network to share the relevant network state information with each other without having to depend on a server to mitigate against the entire system going down from a single point of failure when the server goes down.

To ensure data can be reliably and securely transferred over BLE, initial handshake and subsequent data interchange for transmission of sensitive data such as account credentials between a user's communication device and an access device can be enabled after device verification and securing of the communication transport channel. Data transfer can use variable packet sizes, and inclusion of a checksum in each packet can provide file transfer integrity. Transport channel level security can be maintained by using the lowest packet level encryption to create a secure channel similar to a mutual-SSL authentication.

A BLE based device network can be made up of access devices (e.g., point-of-sale terminals) and user communication devices that have the required BLE application (e.g., a payment application, mobile wallet application, merchant application, etc.) installed and running within the merchant location (e.g., store or place-of-sale). These BLE-enabled devices can connect with each other and form device clusters using the techniques described herein. BLE allows a device to have a maximum of seven live connections at any point of time, and thus the upper limit number of devices in a device cluster can be set to seven device members.

When a new user enters the merchant location with the BLE application running on the user's communication device, the communication device can continuously scan for connectable devices with a pre-defined Bluetooth Generic Attribute (GATT) Profile. For example, the BLE application installed on the BLE enabled devices may advertise a universally unique identifier (UUID) representing a transaction service or UUID representing the specific merchant. The user's communication device may pick up the advertisements from the peer devices at the merchant location, filter them based on their advertised GATT profile, and connects to a maximum of seven devices after sorting them by signal strengths. Each advertisement packet of the BLE enabled device may contain a unique device identifier that allows other devices to identify and reconnect to the device if connection is lost or interrupted.

A device cluster can be formed with up to seven devices connect to each other. The new user's communication device may obtain the network state information about makeup of all device clusters in the BLE network. This is possible because each device cluster includes at least one device that overlaps with another device cluster. These devices return the count of devices in their parent clusters to the new user's communication device. If any of the devices connected to the user's communication device is part of a device cluster having less than seven device members, the user's communication device becomes a part of that cluster and updates the network state information to all devices that are connected to the user's communication device. These devices then propagate the information throughout the BLE peer to peer network. If the devices connected to the user's communication device are all part of full device clusters having seven device members, the user's communication device can create a new device cluster with two of the connected devices with highest signal strengths. Once connected to the BLE network, the user's communication device can obtain the network state information of the network and stores it locally. This allows the network state information to be stored in a distributive manner throughout the network.

Anytime a user moves from one physical location to another (e.g., from one shopping aisle to another) the signal strengths of the connections may vary based on distance from other devices. Some devices may get disconnected if the user's communication device distances itself too far from other connected devices. As the signal strength of a connected devices weakens, a configurable number of attempts can be made to reconnect to the relocated device. This retry mechanism can been made part of the BLE application. If the reconnection is successful, the relocated communication device continues to be part of the original device cluster. However, if the reconnection fails after multiple attempts, the peer devices within the original device cluster may dismember the user's communication device from the device cluster by updating the network state information to disassociate the device identifier of the user's communication device from the cluster identifier. This update can then be propagated throughout the BLE network with each device in network updating its local state. This can be performed as an event driven mechanism or a polling mechanism. Meanwhile, the relocated communication device may connect to other devices in the network with high signal strengths that are in the vicinity of the new location of the communication device. If the signal strength of the new connections is strong and the device clusters that these connected devices belong to are not yet saturated, the user's communication device can be added to the device cluster with highest signal strength. If the device clusters are full, the relocated communication device can form a new cluster with two other peer devices with highest signal strengths.

Each device in the device network may maintain a copy of the network state information of the network. This information may include the cluster identifier of each device cluster in the network, device identifiers of device members of these device clusters, count of devices making up each cluster, and the state of each access device (e.g., whether the access device is currently in use to conduct a transaction). Any changes (e.g., formation of new device clusters, new devices being added to an existing device cluster, devices being removed from a device cluster, secure channel establishment between an access device and a user device, etc.) can trigger updates that are propagated throughout the network. Devices that participate in any of these changes may update their local copy of the network state information and inform the neighboring connected devices of these changes. These devices may in turn update their own tables and continue to propagate this information further. Any device receiving the update can first check if its local network state information is up to date by comparing the local state information and its timestamp with the received information and received timestamp. The recipient device may propagate the received information further only if the received network state information is more recent and does not match the locally stored network state information.

Figure 7:
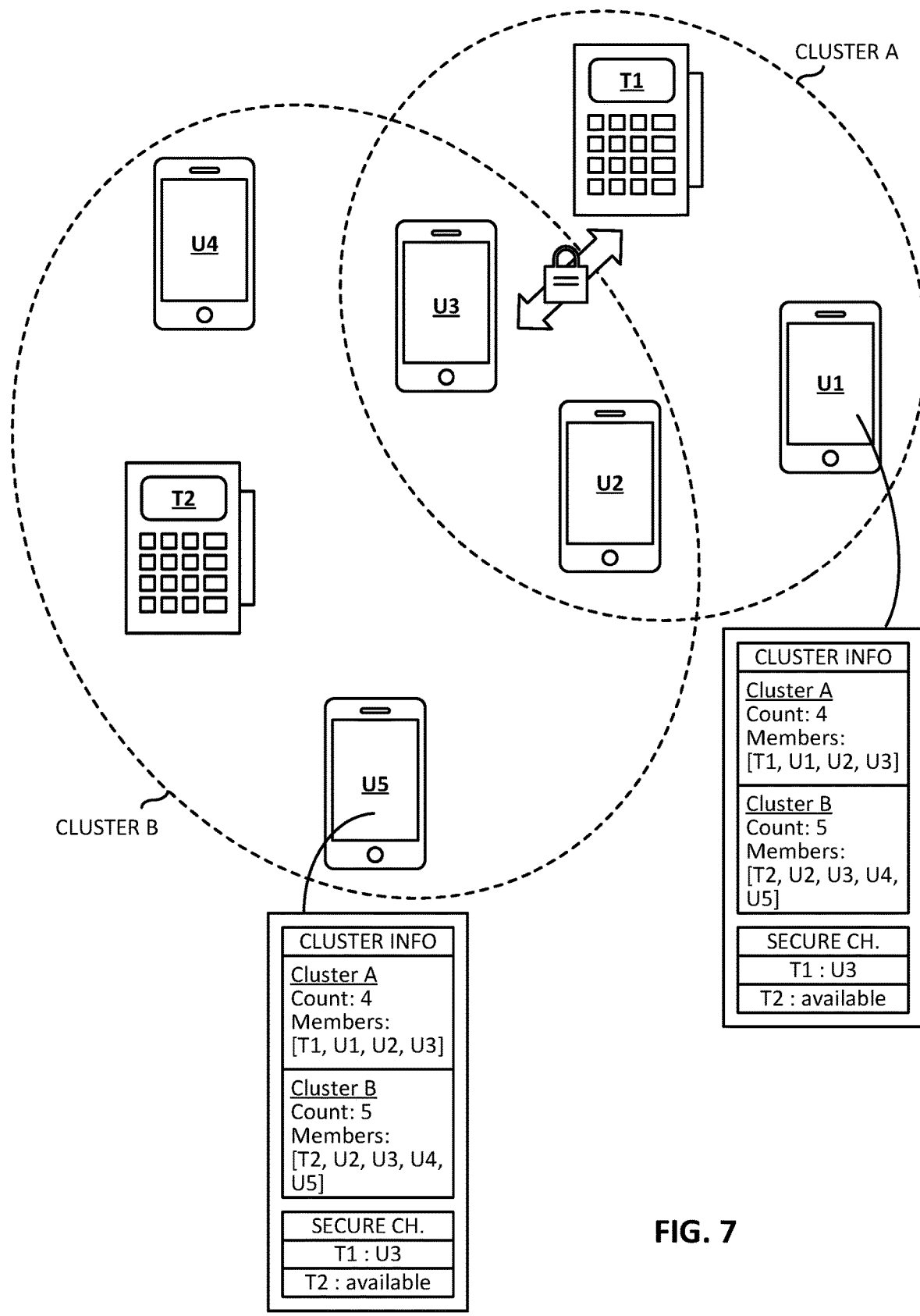
FIG. 7 illustrates the state of a device network at a merchant location at a first point of time, according to some embodiments.

FIG. 7 illustrates an example of the state of a device network at a merchant location at a first point of time, according to some embodiments. The device network may include communication devices U1, U2, U3, U4, and U5 corresponding to users shopping at the merchant location. The device network may also include access devices T1 and T2 (e.g., point-of-sale terminals) distributed at different locations within the merchant location. In some embodiments, the device network may also include one or more repeater devices (not shown). The repeater devices can be a BLE-enabled device whose only purpose is to store and provide network configuration information and/or network state information. The repeater devices can be deployed at the merchant location to cover any network dead spots that may be out of range of the access terminals such that a user's communication device can always connect to a device regardless of where the consumer is within the merchant location and regardless of whether any other users are present or nearby.

The device network shown in FIG. 7 may include device cluster A and device cluster B. Device cluster A may have device members including communication devices U1, U2, and U3, and access device T1. Device cluster B may have device members including communication devices U2, U3, U4, and U5, and access device T2. At the current state of the device network, communication device U3 can be conducting a transaction with access device T1 over a secured communication channel, while access device T2 can be idle. Accordingly, the network state information of the device network at this point in time may include the device cluster information indicating the device membership of each device cluster, and application specific data such as secure channel information indicating whether any of the access devices are in use.

For example, each of the devices in the device network including communication device U1 and U5 may store a local copy of the network state information. The network state information may include a list of cluster identifiers (e.g., cluster A, cluster B) and their attributes. The attributes of cluster A may have a device member count of 4, and be associated with the device identifiers of devices T1, U1, U2, and U3. The attributes of cluster B may have a device member count of 5, and be associated with the device identifiers of devices T2, U2, U3, U4, and U5. The network state information may also include the status of the secured channels of access devices T1 and T2. For example, the status of the secured channel of access device T1 may indicate that it is conducting a transaction with communication device U1, and the status of the secured channel of access device T2 may indicate that it is available. In some embodiments, an access device may support multiple secured channels which can be used to conduct concurrent transactions with different user communication devices, and the network state information may include a status for each of the secured channels of the access device.

Figure 8:
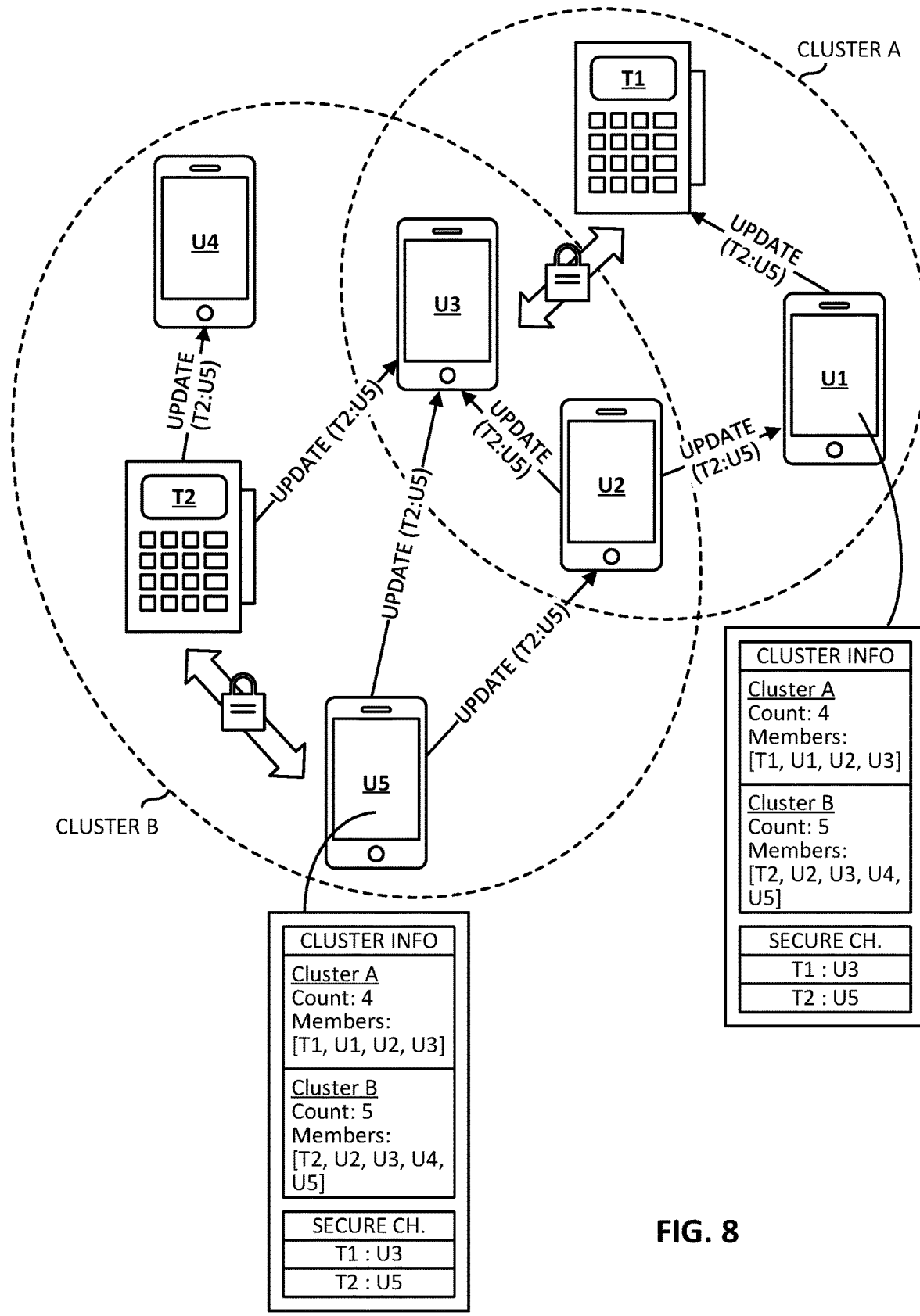
FIG. 8 illustrates the state of a device network at a merchant location at a second point of time, according to some embodiments.

At a later point in time, the user of communication device U5 has finished shopping, and may want to check out and connect with an access device to conduct a transaction to pay for goods or services. The BLE application installed on communication device U5 can determine that access device T2 is available based on the local copy of the network state information. Communication device U5 may then established a secured channel with access device T2 such that account credentials can be provided to access device T2 to process the transaction. Upon establishing the secured channel, communication device U5 and/or access device T2 may their local copy of the network state information to indicate that the secure channel of access device T2 is conducting a transaction with communication device U5 as shown in FIG. 8.

Communication device U5 may provide the updated network state information including a timestamp to communication devices U2 and U5 within range of communication device U5. Access terminal T2 may provide the updated network state information including a timestamp to communication devices U3 and U4 within range of access device T2. If communication device U3 has already updated its local copy of the network state information with the update from communication device U5, then communication device U3 need not further update its local copy of the network state information with the update received from access terminal T2. When communication device U2 receives the updated network state information from communication device U5, communication device U2 may update its local copy and propagate the updated network state information to communication devices U1 and U3 within range of communication device U2. Communication device U1 may in turn update its local copy and propagate the updated network state information to access terminal T1 within range of communication device U1. Meanwhile, when communication device U3 receives the update from communication device U2, communication device U3 may determine that its local copy of the network state information is already up to date, and thus communication device U3 need not further update its local copy and need not further propagate the update from communication device U2 to other peer devices.

Although certain aspects of the techniques disclosed herein has been described using BLE as an exemplary wireless communication protocol, it should be understood that the techniques described herein can be applied to other wireless communication protocols including protocols that utilize one or more radio frequencies as a transmission medium.

Figure 9:
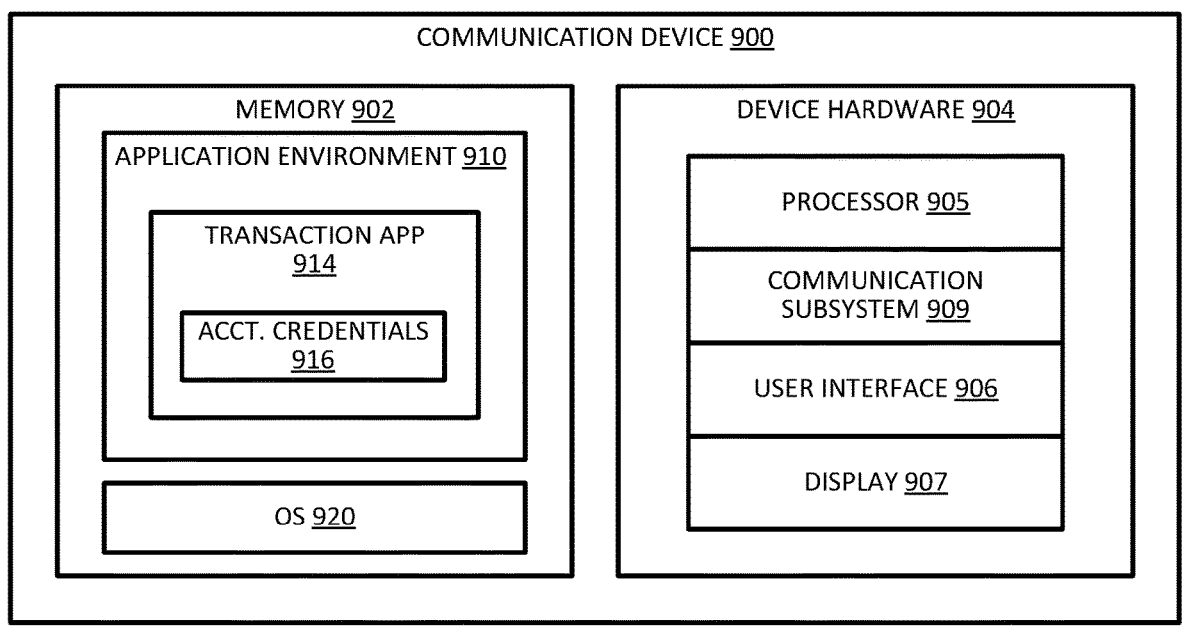
FIG. 9 illustrates a block diagram of a communication device, according to some embodiments.

FIG. 9 illustrates a block diagram of a communication device 900, according to some embodiments. In some embodiments, communication device 900 can be a mobile device operated by a user. Communication device 900 may include device hardware 904 coupled to a memory 902. Device hardware 904 may include a processor 905, a communication subsystem 909 with one or more transceivers capable of communication with an external device using a wireless communication protocol, and a user interface 906. In some embodiments, device hardware 904 may also include a display 907 (which can be part of user interface 906). Processor 905 can be implemented as one or more integrated circuits (e.g., one or more single core or multicore microprocessors and/or microcontrollers), and is used to control the operation of communication device 900. Processor 905 can execute a variety of programs in response to program code or computer-readable code stored in memory 902, and can maintain multiple concurrently executing programs or processes. User interface 906 can include any combination of input and output elements to allow a user to interact with and invoke the functionalities of communication device 900. In some embodiments, user interface 906 may include a component such as display 907 that can be used for both input and output functions.

Memory 902 can be implemented using any combination of any number of non-volatile memories (e.g., flash memory) and volatile memories (e.g., DRAM, SRAM), or any other non-transitory storage medium, or a combination thereof media to store computer executable code. Memory 902 may store an operating system (OS) 920 and an application environment 910 where one or more applications reside including a transaction application 914 executable by processor 905. Transaction application 912 can enable communication device 900 to join a device network and establish a secure channel with an access device to conduct a transaction. Transaction application 914 can be an application that uses, accesses, and/or stores sensitive information such as account credentials 916 (e.g., account identifiers, tokens, etc.). For example, transaction application 914 can be a wallet or payment application or a merchant application that uses a token to conduct transactions via communication device 900. In some embodiments, access to transaction application 914 by a user can be protected by user authentication data such as a password, passcode, PIN, etc. For example, when a user attempts to launch or execute transaction application 914, the user may be requested to enter valid user authentication data before the user can access transaction application 914. Transaction application 914 may include a cryptography module to encrypt and decrypt communications and/or to generate transaction cryptograms. In some embodiments, one or more of these components can be provided by another application or component that is not part of application 914. Account credentials 916 may store sensitive information such as account credentials (e.g., PAN, token) and other account parameters such as a limited-use key that are used to conduct a transaction. The cryptography module may provide cryptographic functionalities for transaction application 914. For example, the cryptography module may implement and perform encryption/decryption operations for transaction application 914 using encryption algorithms such as DES, AES, TDES/TDEA, or the like, and/or hash functions such as SHA, or the like. When transaction application 914 accesses account credentials 916 such as a token or limited-use key stored to conduct a transaction, transaction application 914 may invoke the cryptography module to generate a transaction cryptogram based on the limited-use key and/or token.

The techniques described herein may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

The methods and processes described herein are exemplary in nature, and the methods and processes in accordance with some embodiments may perform one or more of the steps in a different order than those described herein, include one or more additional steps not specially described, omit one or more steps, combine one or more steps into a single step, split up one or more steps into multiple steps, and/or any combination thereof.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

One or more features from any embodiment may be combined with one or more features of any other embodiment without departing from the scope of the invention.

A recitation of "a," "an," or "the" is intended to mean "one or more" unless specifically indicated to the contrary.

What is claimed is:

1. A communication device comprising:
    a transceiver adapted to exchange data using a wireless communication protocol that allows a device to maintain concurrent connections with up to a maximum number of concurrently connected devices;
    a processor; and
    a memory storing executable code, which when executed by the processor, causes the communication device to perform operations including:
        determining a set of peer devices within a communication range of the communication device using the wireless communication protocol, the peer devices being part of a device network having a plurality of device clusters, each including one or more devices that belong to multiple ones of the device clusters, wherein the device network includes a plurality of access devices and a plurality of user communication devices;
        determining whether any of the peer devices is part of a device cluster having less than a maximum number of device members;
        when a peer device in the set of peer devices within the communication range of the communication device is determined to be part of an existing device cluster having less than the maximum number of device members, adding the communication device to the existing device cluster;
        when each peer device in the set of peer devices within the communication range of the communication device is determined to be part of a full device cluster having the maximum number of device members, creating a new device cluster and adding the communication device and a plurality of peer devices in the set of peer devices meeting a signal strength criteria to the new device cluster, such that the new device cluster includes at least one device included in another of the device clusters; and
        locally storing network state information including a mapping of which user device is interacting with which access device to conduct a payment transaction,
        wherein subsequent to adding the communication device to either the existing device cluster or the new device cluster, in response to the communication device losing connectively with other peer devices in the device cluster that the communication device is part of, the communication device attempts a predetermined number of times to re-establish connection with the other peer devices m the device cluster.

2. The communication device of claim 1, wherein the signal strength criteria is the two highest two signal strengths detected by the communication device.

3. The communication device of claim 1, wherein the maximum number of device members is equal to the maximum number of concurrently connected devices allowed by the wireless communication protocol.

4. The communication device of claim 1, wherein after the communication device has failed to re-establish connection with the other peer devices in the device cluster, the communication device establishes connectivity with a plurality of devices that are not part of the device cluster, and either joins another device cluster or creates another new device cluster.

5. The communication device of claim 1, wherein the locally stored network state information further includes a cluster identifier for each device cluster in the device network, and a device identifier for each device member of a corresponding device cluster.

6. The communication device of claim 5, wherein the operations further include:
   receiving network state information from a peer device; and
   when the received network state information is newer that the locally stored network state information and the received network state information is different than the locally stored network state information, updating the locally stored network state information with the received network state information.

7. The communication device of claim 1, wherein the device network further includes a plurality of repeater devices.

8. A method for establishing a device network having a plurality of device clusters, the method comprising:
   determining, by a communication device, a set of peer devices within a communication range of the communication device using a wireless communication protocol, wherein the wireless communication protocol allows a device to maintain concurrent connections with up to a maximum number of concurrently connected devices, wherein the device network includes a plurality of access devices and a plurality of user communication devices; and wherein each device cluster includes one or more devices that belong to multiple ones of the device clusters,
   determining, by the communication device, whether any of the peer devices is part of a device cluster having less than a maximum number of device members;
   when a peer device in the set of peer devices within the communication range of the communication device is determined to be part of an existing device cluster having less than the maximum number of device members, updating, by the communication device, that existing device cluster to include the communication device;
   when each peer device in the set of peer devices within the communication range of the communication device is determined to be part of a full device cluster having the maximum number of device members, creating, by the communication device, a new device cluster to include the communication device and a plurality of peer devices in the set of peer devices meeting a signal strength criteria, such that the new device cluster includes at least one device included in another of the device clusters; and
   locally storing, by the communication device, network state information including a mapping of which user device is interacting with which access device to conduct a payment transaction,
   wherein subsequent to adding the communication device to either the existing device cluster or the new device cluster, in response to the communication device losing connectively with other peer devices in the device cluster that the communication device is part of, the communication device attempts a predetermined number of times to re-establish connection with the other peer devices m the device cluster.

9. The method of claim 8, wherein the signal strength criteria is the highest two signal strengths detected by the communication device.

10. The method of claim 8, wherein the maximum number of device members is equal to the maximum number of concurrently connected devices allowed by the wireless communication protocol.

11. The method of claim 8, wherein after the communication device has failed to re-establish connection with the other peer devices in the device cluster, the communication device establishes connectivity with a plurality of devices that are not part of the device cluster, and either joins another device cluster or creates another new device cluster.

12. The method of claim 8, wherein the locally stored network state information further includes a cluster identifier for each device cluster in the device network, and a device identifier for each device member of a corresponding device cluster.

13. The method of claim 12, further comprising:
   receiving, by the communication device, network state information from a peer device; and
   when the received network state information is newer that the locally stored network state information and the received network state information is different than the locally stored network state information, updating, by the communication device, the locally stored network state information with the received network state information.

14. The method of claim 8, wherein the device network further includes a plurality of repeater devices.

* * * * *